United States Patent [19]
Kinnunen et al.

[11] Patent Number: 6,144,656
[45] Date of Patent: Nov. 7, 2000

[54] SYNCHRONIZING A TELECOMMUNICATIONS CONNECTION IN A MOBILE COMMUNICATIONS SYSTEM

[75] Inventors: Kimmo Kinnunen, Jyväskylä; Osmo Schroderus, Sumiainen, both of Finland

[73] Assignee: Nokia Telecommunications OY, Espoo, Finland

[21] Appl. No.: 08/817,951

[22] PCT Filed: Aug. 13, 1996

[86] PCT No.: PCT/FI96/00437

§ 371 Date: Apr. 14, 1997

§ 102(e) Date: Apr. 14, 1997

[87] PCT Pub. No.: WO97/07604

PCT Pub. Date: Feb. 27, 1997

[30] Foreign Application Priority Data

Aug. 14, 1995 [FI] Finland ..................... 953844

[51] Int. Cl.[7] ............... H04B 7/00; H04B 7/212; G08C 17/00
[52] U.S. Cl. ............ 370/347; 370/311; 370/350; 455/38.3
[58] Field of Search ............ 370/311, 318, 370/319, 345, 347, 350, 336, 337; 455/38.3, 11.1, 574, 343, 553, 434, 515, 455, 509; 375/354, 362, 364, 369

[56] References Cited

U.S. PATENT DOCUMENTS

| | | |
|---|---|---|
| 5,128,938 | 7/1992 | Borras ..................... 370/311 |
| 5,150,361 | 9/1992 | Wieczorek et al. ............ 370/311 |
| 5,241,542 | 8/1993 | Natarajan et al. ............ 455/343 |
| 5,515,366 | 5/1996 | Chieu et al. ................. 370/347 |
| 5,617,412 | 4/1997 | Delprt et al. ................. 370/281 |
| 5,636,243 | 6/1997 | Tanaka ........................ 370/350 |
| 5,678,192 | 10/1997 | Paavonen et al. ............ 455/38.3 |
| 5,771,463 | 6/1998 | Lehmusto et al. ............ 455/509 |
| 5,790,938 | 8/1998 | Talarmo et al. ............... 455/509 |

FOREIGN PATENT DOCUMENTS

| | | |
|---|---|---|
| 663 737 | 7/1995 | European Pat. Off. . |
| 2 290 677 | 1/1996 | United Kingdom . |

OTHER PUBLICATIONS

Radio Equipment and Systems (RES); European Telecommunications Standards Institute, Interim European Telecommunication Standard, Working Draft pr I–ETS 300 392–2, Sep. 1994 pp. 542–544.

*Primary Examiner*—Ricky Ngo
*Assistant Examiner*—Steven Nguyen

[57] ABSTRACT

A method for synchronizing a telecommunications connection in a mobile communications system including a database, at least one base station communicating with mobile stations on system channels which include control channels and traffic channels. Mobile stations communicate with other mobile stations using the base station and the system channels or communicate directly using a direct mode channel. Time slots and frame structures of the system channels are synchronized with time slots and frame structures of the direct mode channels.

10 Claims, 4 Drawing Sheets

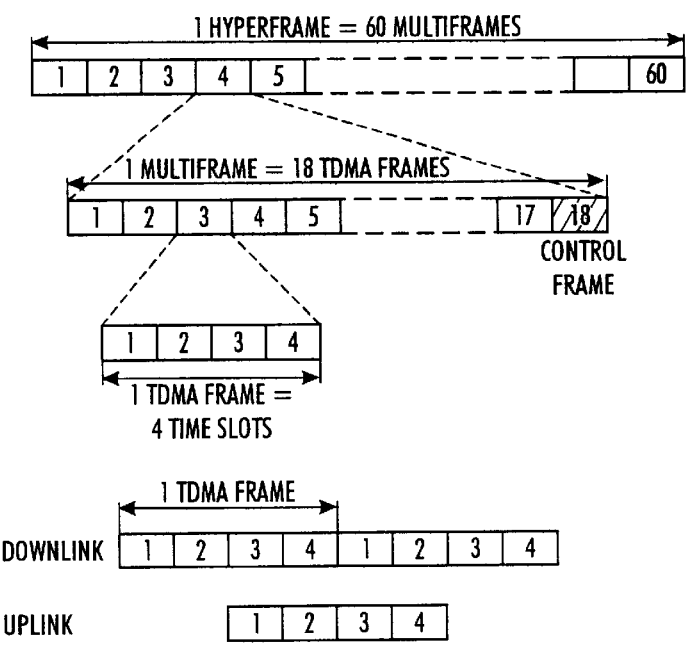

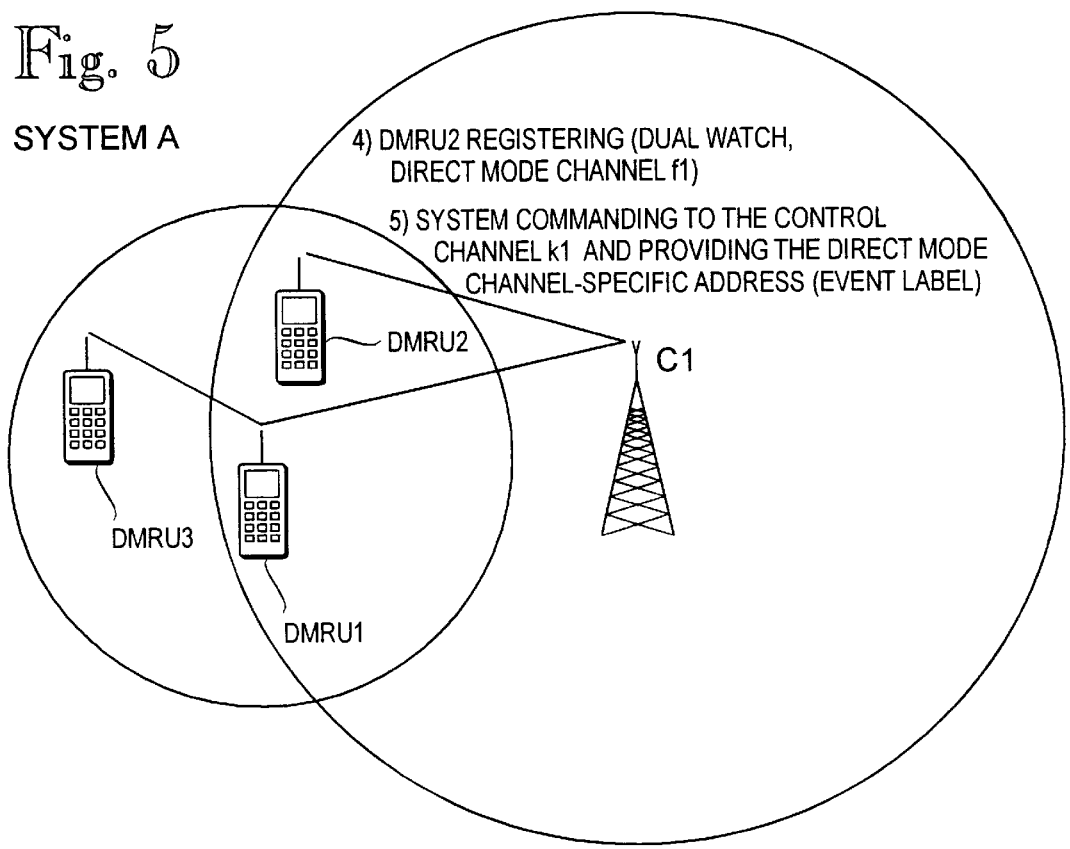
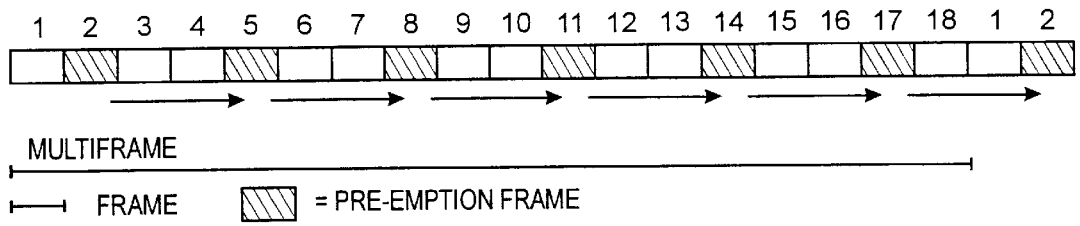
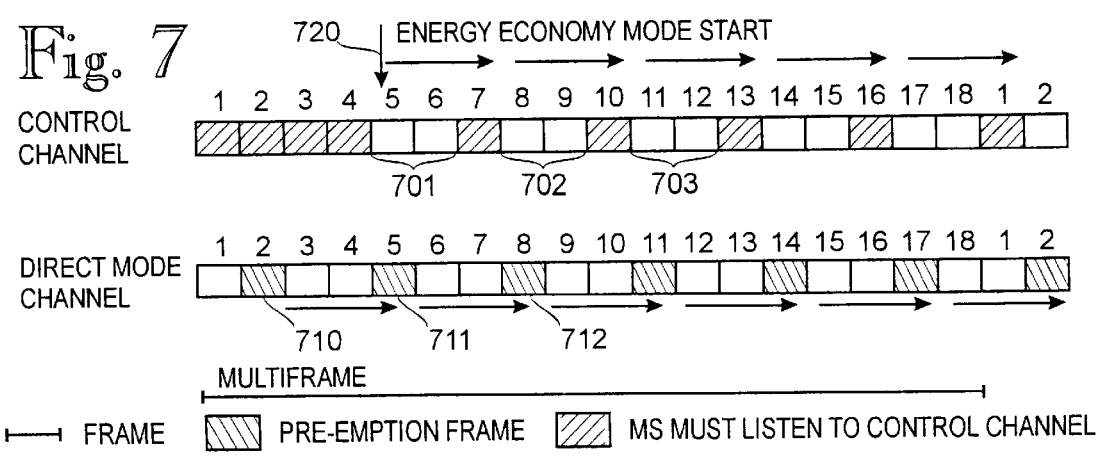

SYNCHRONIZING A TELECOMMUNICATIONS CONNECTION IN A MOBILE COMMUNICATIONS SYSTEM

This application is the national phase of international application PCT/FI96/00437, filed Aug. 13, 1996 which designated the United States.

FIELD OF THE INVENTION

The invention relates to a method for synchronizing a telecommunications connection in a mobile communications system comprising a database; at least one base station communicating with mobile stations on TDMA (Time Division Multiple Access) system channels consisting of control channels and traffic channels whose uplink and downlink frequencies are divided into frames a part of which may be defined dynamically, by means of determining an energy economy mode start frame and the length of an energy economy cycle, for a mobile station in said database as energy economy mode sleeping frames, during which said mobile station is not prepared to receive transmissions on downlink frequencies; at least a first mobile station communicating on a direct mode channel divided into frames and wishing to operate in a dual watch mode both on the control channel of the mobile communication system and on said direct mode channel which comprises pre-emption frames, by means of which the mobile stations communicating on said direct mode channel request transmission turns for themselves.

BACKGROUND OF THE INVENTION

The invention relates to the field of mobile telephone systems. A subscriber of a mobile telephone system, that is, a subscriber station, e.g. a mobile telephone or a mobile station may be connected to a mobile network or system, whereby it is connected to the mobile network via system channels maintained by the base stations of the mobile network.

In addition to the system channels located in mobile telephone systems, so-called direct mode channels may be used in association with the mobile system, i.e. communication takes place in a direct mode. Subscriber stations communicating in the direct mode do not communicate directly with the mobile network or the base stations related to it. Direct mode channels are frequencies on which mobile telephones or other means of communication can communicate without the system directly with each other, or via repeater stations, either with the base stations of the system or with other mobile stations.

Direct mode channels are typically used in situations in which e.g. a group of hand-held mobile phones communicate with each other so remote from the base stations that the use of system channels is not possible.

Another important use of direct mode channels is increasing the capacity when the traffic in the system rapidly increases (incident) in some part of the service area of the system, e.g. in some spot-like part.

A direct mode channel is a channel that is typically not used by the system. It may be e.g. a channel whose channel spacing is the same as that in the mobile communications system, e.g. 12.5 kHz or 25 kHz. On direct mode channels a mode of simplex operation is used. From the group of the mobile stations operating on the direct mode channel, the transmitting party has tuned his transmitter onto the channel and is transmitting speech or data information. The other mobile stations that have been activated onto the direct mode channel have tuned their receivers onto the same frequency so that they will directly hear the transmission.

On a direct mode channel, communication may take place by means of analog modulation or digital modulation. A mobile station transmitting on the channel may also use signalling information, such as information on access rights and priorities, or the group communicating on the channel, or data communication. On a direct mode channel encryption may be carried out, or plain speech can be transmitted.

Subscriber stations operating in the direct mode communicate with other subscriber stations on a direct mode channel without having a direct connection to the base stations of the mobile network. Subscriber stations operating in the direct mode, however, may communicate with the mobile network via repeater stations. A repeater station typically comprises two transceivers connected to each other.

The prior art solutions are attended by the problem how to make a mobile station operating in accordance with the dual watch facility save its own battery when it is communicating both on a direct mode channel and on the system channel of the mobile communication system. In communication carried out in accordance with the standard dual watch facility, the mobile station communicating on the direct mode channel must listen to every second time-slot. This strains the batteries of the mobile station and causes a heavy load to the mobile station in other respects, as well. On the other hand, if the mobile station did not listen to the control channel of the system at all, the messages addressed to the mobile station from the system would not be received, and the system would not know when the mobile station is possibly listening to the control channel.

Another problem related to prior art solutions is the fact that in a situation in which a mobile station is transmitting on a direct mode channel, it is not possible for the mobile station to operate in accordance with the dual watch facility in certain frames on the control channel of the system, since it must simultaneously receive a pre-emption frame on the direct mode channel, in which frame the other mobile stations communicating on the direct mode channel can request a speech turn/call transfer for themselves. The system is aware of a mobile station transmitting on a traffic channel subject to the system, and therefore it is possible for the system to buffer the message addressed to this mobile station until the end of the speech turn when necessary. The system has no information available on traffic taking place on the direct mode channel, and it is thus not aware of the identifier of the mobile station that is transmitting currently, and it thus cannot buffer messages addressed to it.

BRIEF DESCRIPTION OF THE INVENTION

The object of the present invention is to implement a method, a mobile communications system and a mobile station, for solving the problems related to solutions in accordance with the prior art.

The object of the invention is to implement an energy economy mode in a mobile communications system in association with a mobile station operating in accordance with the dual watch facility for improving the dual watch facility. The object of the invention is thus to implement a method that enables, in a controlled manner, reducing the need of a mobile station communicating in the dual watch mode on a direct mode channel to listen to the control channel.

The object of the invention is to develop a way of communication by means of which it is possible to synchronize the timing of the pre-emption frames on a direct mode channel to the timing of the downlink transmissions of the mobile communications system in a suitable manner.

The object of the invention is to make sure that a mobile station communicating on a direct mode channel in accordance with the dual watch facility will not lose information transmitted in the pre-emption frames on the direct mode channel, but is yet able to listen to the control channel of the mobile communication system in accordance with the dual watch facility.

This new type of method for synchronizing a telecommunications connection is achieved with a method of the invention, which is characterized by communicating from the first mobile station that operates on said direct mode channel, by sending a registration message to said base station on the system channel of the mobile communication system, a wish of the first mobile station to operate in a dual watch mode on the one hand, and in an energy economy mode on the control channel of the mobile communications system on the other hand, in response to said registration message, checking from said database whether an energy economy mode start frame and the length of the energy economy cycle have been determined for said direct mode channel, and if this is not the case, determining and storing in said database such an energy economy mode start frame and such a length of the energy economy cycle that each of said pre-emption frames co-incides with a sleeping frame of the energy economy mode, transmitting to the first mobile station the information on the desired control channel of said base station and the timing information related to the desired control channel, and a command to switch to the energy economy mode, said command containing the information on the energy economy mode start frame and the length of the energy economy cycle, in response to said communicating, the first mobile station switching to the dual watch mode on the one hand and to the energy economy mode on the other, to communicate either on said direct mode channel or said control channel so that the mobile station can listen to the control channel between the transmission time-slots of the direct mode channel while communicating on the direct mode channel.

The invention further relates to a mobile communications system which is similar to the above mobile communications system, but characterized by comprising: means responsive to the registration message sent by said mobile station for determining and storing in said database such an energy economy mode start frame and such a length of the energy economy cycle that each of said pre-emption frames coincides with the sleeping frame of the energy economy mode, and means for transmitting the information on the desired control channel of said base station and the timing information related to it, and the information on the energy economy start frame and the length of the energy economy cycle to other mobile stations.

The invention further relates to a mobile station communicating on a direct mode channel that is divided into frames consisting of time-slots, the mobile station comprising: a transceiver which is arranged to transmit and receive transmissions of the mobile station, and a controller for controlling the operation of the mobile station.

The mobile station of the invention further comprises means responsive to the information transmitted by the mobile communications system for switching the mobile station to the dual watch mode on the one hand and to the energy economy mode on the other to communicate either on said direct mode channel or said control channel, so that the mobile station can listen to the control channel between the transmission time-slots of the direct mode channel while communicating on the direct mode channel.

The idea of the invention is to allow the mobile stations communicating on the direct mode channel to "sleep" during frames determined in accordance with the energy economy function of the mobile communications system. The mobile station thus does not have to listen to the control channel of the mobile communications system, but it may listen to the direct mode channel, and in particular, it is able to detect a transmission of a pre-emption frame on the direct mode channel.

The invention is based on the idea that the synchronization of the mobile stations communicating on the direct mode channel is carried out so that when a mobile station communicating on the direct mode channel wishes to communicate in the dual watch mode, it reports to the base station of the system, and simultaneously communicates its wish to operate in the dual watch mode on said direct mode channel and on the system channel of the mobile communications system. In addition, the mobile station may also communicate to the mobile communications system the identifier of the direct mode channel on which it is communicating. Thereafter, the mobile communications system accepts the mobile station to the system and assigns it a suitable control channel of the desired base station for dual watch operation, and indicates the synchronization of said channel. In accordance with the invention, the system also communicates to the mobile station that the communication will take place in the energy economy mode. In accordance with the invention, the energy economy group to be used and the energy economy cycle start point are also communicated to the mobile station. The mobile communications system may also provide the mobile station communicating on the direct mode channel with a direct mode channel—specific event label, by means of which the mobile stations communicating in the dual watch mode on said direct mode channel may be forced to switch to another energy economy mode or to terminate the energy economy mode. Thereafter, the mobile station starts to communicate in the dual watch and energy economy mode on the direct mode channel, and it adapts the time-slot and frame synchronization of its own transmission to match the synchronization of the control channel of the mobile communications system. If necessary, the system also adapts the time-slot and frame synchronization of the transmission of other mobile stations communicating on said direct mode channel to correspond to the synchronization of the control channel of the mobile communications system. This means that the transmission of the mobile station and the dual watch mode are timed so that the transmissions in the pre-emption frames on the direct mode channel of the mobile stations are placed so that they co-incide with the sleeping frames of the energy economy mode of the control channel. Thus, since there are no incoming transmissions from the direction of the mobile communications system to the mobile station on the direct mode channel during the sleeping frames, said mobile station communicating on the direct mode channel may concentrate on receiving communication on the direct mode channel, and particularly a pre-emption frame on the direct mode channel.

The advantage of the present invention is the fact that it solves the problems related to prior art solutions.

Another advantage of the invention is that it enables the dual watch mode for a mobile station communicating on a direct mode channel, and saving in power consumption achieved in the dual watch mode. This saving is obtained as the mobile station does not need to visit the control channel of the system in every frame.

BRIEF DESCRIPTION OF THE DRAWINGS

In the following, the invention will be disclosed in more detail with reference to the attached drawings in which FIG. 2 shows the frame structure of the TETRA mobile communications system, FIG. 3 shows a picture of time-slot synchronization, illustrating implementation of time-slot synchronization for achieving a dual watch facility between a direct mode channel and a control channel of the mobile communications system, FIG. 4 shows a picture of frame synchronization, illustrating implementation of frame synchronization for achieving a dual watch facility between the direct mode channel and the control channel of the mobile communications system, FIG. 5 shows registration of a dual watch mobile station DMRU1 to a system A and a manner in accordance with the invention for activating the energy economy mode, FIG. 6 illustrates a situation in which a pre-emption frames occur on the direct mode channel, FIG. 7 shows a picture of frame synchronization in a situation in which the energy economy mode is activated.

DETAILED DESCRIPTION OF THE INVENTION

The invention is based on the idea that the frame structure of the system and the direct mode channel must be synchronized with each other. It is further supposed that the frame structure used on the direct mode channel is continuous as far as possible.

The use of the energy economy mode in accordance with the invention requires maintaining on the direct mode channel the same frame structure and the same frame counter as on the control channel.

Figure 1:
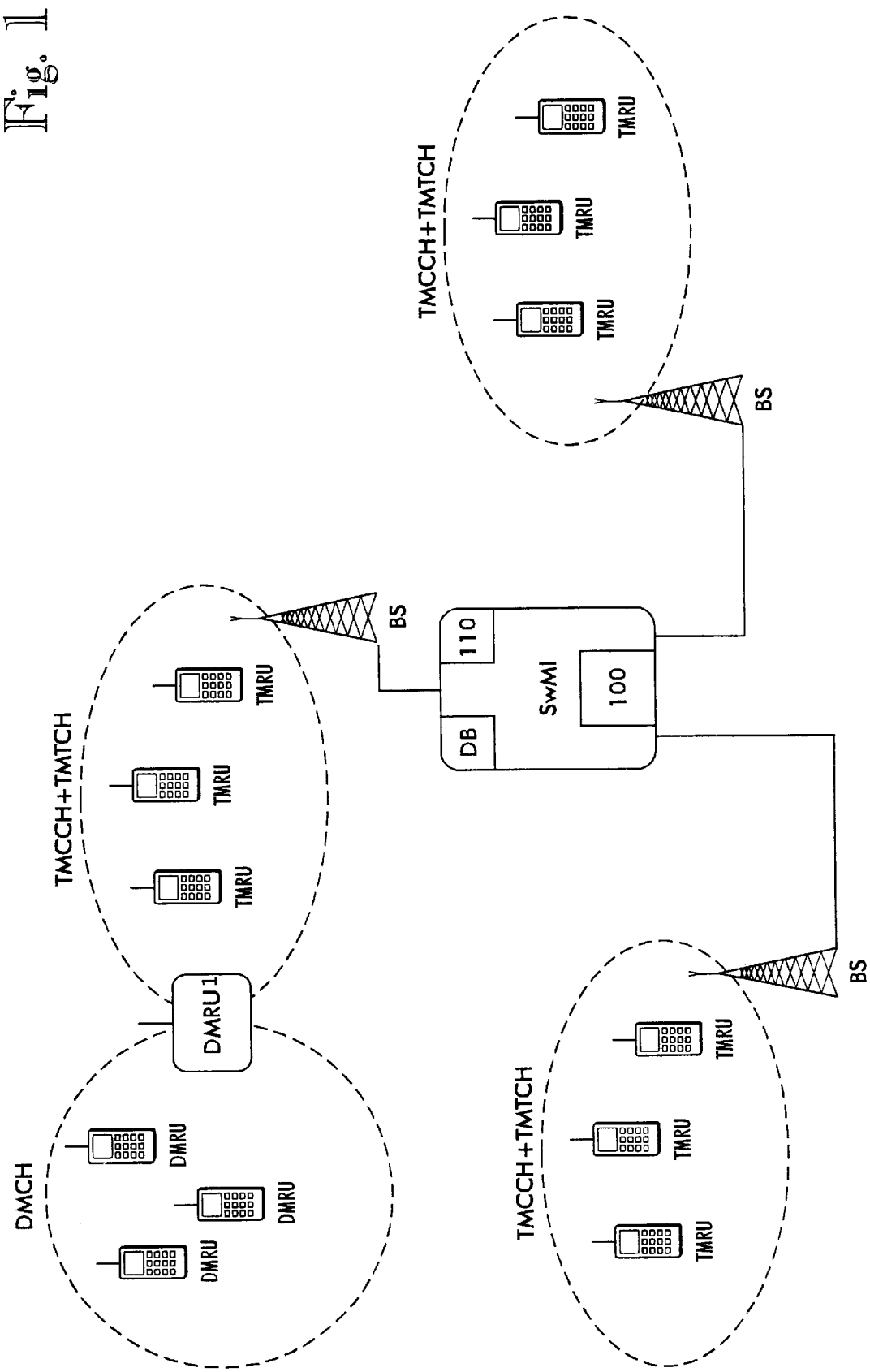
FIG. 1 shows a block diagram of the mobile communications system of the invention in which the method of the invention may be applied.

FIG. 1 shows a block diagram of the mobile communications system of the invention in which the method of the invention is applied. The mobile communications system may also include mobile stations TMRU communicating on the system channels TMCCH, TMTCH; a direct mode channel DMCH; system channels TMCCH and TMTCH; base stations BS and the system infrastructure SwMI. The system infrastructure SwMI consists of e.g. a mobile exchange, transmission equipment, and an operations and maintenance centre. The invention particularly relates to mobile stations operating on the direct mode channel DMCH, and the operation of the mobile stations DMRU in synchronism with the system channels of the mobile communications system in accordance with the dual watch facility in order that a minimal load is caused to the power sources of said mobile stations. FIG. 1 also shows a mobile station DMRU1 operating in the dual watch mode.

The invention relates to a mobile communications system (FIG. 1) comprising a database placed in some part of the mobile communications system infrastructure, e.g. in the mobile exchange. In addition, the mobile communications system comprises at least one base station BS communicating with mobile stations DMRU1, DMRU2, TMRU on TDMA system channels of the mobile communications system, said channels including control channels TMCCH and traffic channels TMTCH whose uplink and downlink frequencies are divided into frames 1–18 (FIGS. 2–4), part of which may be defined dynamically by means of determining an energy economy mode start frame and the length of an energy economy cycle, for a mobile station in said database as energy economy mode sleeping frames 701, 702, 703, during which said mobile station is not prepared to receive transmissions on downlink frequencies. The mobile communications system further comprises at least a first mobile station DMRU1; 400, (FIG. 8) communicating on a direct mode channel divided into frames, which mobile station wishes to operate in the dual watch mode either on the control channel TMCCH of the mobile communications system or on said direct mode channel DMCH which comprises pre-emption frames 710, 711, 712, by means of which the mobile stations DMRU1, DMRU2, DMRU, 400; (FIG. 8) communicating on the direct mode channel may request a pre-emptive transmission turn or a pre-emptive call for themselves. A transmitting mobile station must receive every pre-emption frame in order that it can be ensured that the mobile stations are allowed a transmission turn, a speech turn, or a call when necessary.

The mobile communications system of the invention is characterized by comprising: means 100 responsive to the registration message (FIG. 5) transmitted by said mobile station DMRU1 for determining and storing in said database DB such an energy economy mode start frame 720 and such a length of the energy economy cycle that each of said pre-emption frames 711, 712 co-incides with the sleeping frame 701, 702 of the energy economy mode.

The mobile communications system of the invention further comprises means 110 for transmitting the information on the desired control channel TMCCH of said base station BS; C1 and the timing information related to it, and the information on the energy economy start frame 720 and the length of the energy economy cycle to said mobile station DMRU1, DMRU2.

FIG. 2 shows the frame structure of the TETRA mobile communications system. On system channels, the frame structure of the uplink frequency, that is, the direction from the mobile station to the base station (RU→BS), is delayed by two time-slots compared with the frame structure of the downlink frequency, that is, the direction from the base station to the mobile station (BS→RU) in accordance with the TETRA protocol. The direct mode channel is also divided into frames and time-slots physically in the same way. There is, however, only one frequency, which is used for communication in both directions. The method of the invention has been intended for a time division multiple access (TDMA) digital mobile communications system, but it may also be used in other types of systems, where applicable. The frame structure is the same both in the operation in the standard trunking mode TM and in the direct mode DM.

FIG. 3 shows an illustration of time-slot synchronization, illustrating implementation of time-slot synchronization for achieving a dual watch facility between the direct mode channel and the control channel of the mobile communications system. In FIG. 3, the first time-slots of the system channels and the first and the third time-slots of the direct mode channels are marked with black for comparing their co-incidence with respect to each other. FIG. 3 shows an illustration of frame synchronization in a situation in which the transmission of a mobile station or mobile stations transmitting on a direct mode channel is synchronized with the downlink synchronization of the control channel of the system so that the mobile stations are able to operate in accordance with the dual watch mode, that is, they are able to transmit and receive both on the direct mode channels and on the channels of the mobile communications system, e.g. receive transmissions in the downlink direction of the control channel, as shown in FIG. 3.

FIG. 4 shows an illustration of frame synchronization, illustrating the implementation of frame synchronization for achieving a dual watch facility between the direct mode channel and the control channel of the mobile communications system. In the figure, the first time-slots of the system channel and the first and the third time-slots of the direct mode channel are marked with black for comparing their co-incidence with respect to each other. The sequence numbers related to the frames of the control channel of the system and to the frames of the direct mode channel are also marked in FIG. 4.

Figure 8:
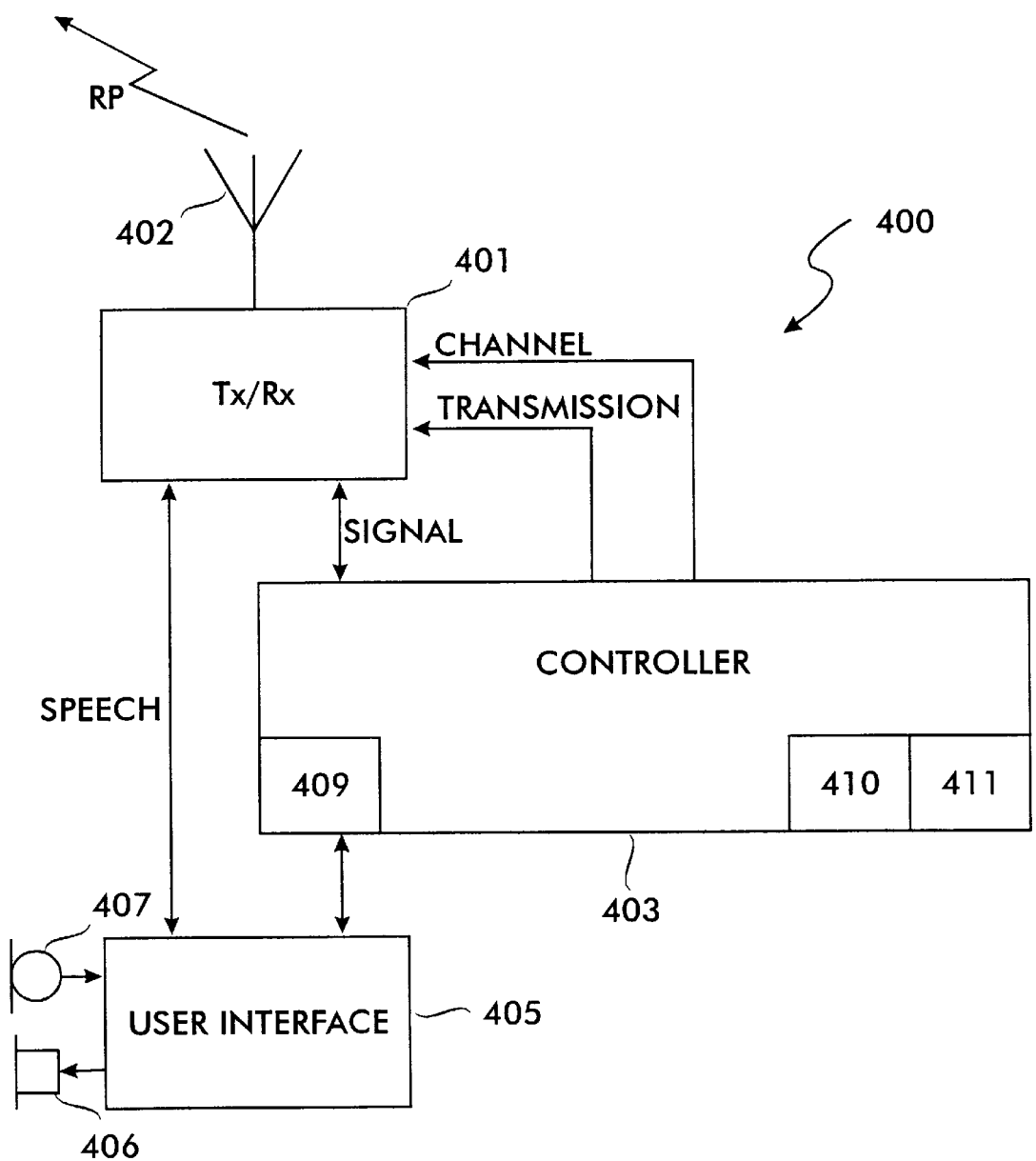
FIG. 8 shows a block diagram of a mobile station in accordance with the invention, communicating on the direct mode channel.

FIG. 5 shows registration of a dual watch mobile station DMRU1 to a system A. When a mobile station DMRU1, DMRU2 (FIG. 5; FIG. 8) wishes to operate in the dual watch mode, it will first report to the system. The mobile station DMRU1, DMRU2 indicates that it wishes to operate in the dual watch mode on the one hand, and in the energy economy mode on the other. The report may also include the identifier of the direct mode channel on which the mobile station in question is communicating. In response to the report, the subscriber data on said mobile station and, if necessary, the information on the user are checked from the database, and it is made sure that the mobile station has the access rights to the services of the network. If the subscriber and the mobile station have the right to use the mobile communications system and the desired services, such as the dual watch and the energy economy mode, the system will inform the mobile station DMRU1, DMRU2 on that it will accept the mobile station and the subscriber to the system and to the dual watch and the energy economy mode, by sending a command message in which the energy economy group and the energy economy start point are indicated. The system thus makes sure that the signalling to the is mobile station DMRU1, DMRU2 is timed to take place in the frames that the mobile station has guided to receive on the control channel. The system may also provide the mobile station DMRU1, DMRU2 with a direct mode channel—specific event label by means of which all the mobile stations DMRU1, DMRU2 in the dual watch mode on the direct mode channel may be forced to switch or to terminate the energy economy mode.

In accordance with the invention, the energy economy mode provided by the system is timed in such a manner that the mobile station does not have to receive signalling (downlink) of the control channel simultaneously when the other mobile stations on the direct mode channel are transmitting in a pre-emption frame, which is then received by said mobile station. The pre-emption frame is a frame on the direct mode channel under which frame the other mobile stations operating on the direct mode channel may interrupt the transmission of the mobile station communicating on the direct mode channel by transmitting a pre-emption request if need be, since said other mobile stations themselves wish to transmit on said direct mode channel. Unlike with other frames, during the pre-emption frame the transmitting mobile station must listen on the direct mode channel frequency to the time-slot which is the same as the one during which the transmitting mobile station should listen to the control channel of the system.

The energy economy mode disclosed above is disclosed in TETRA Specification "prI-ETS 300 392-2. September 1994. Radio Equipment and Systems (RES); Trans European Trunked Radio (TETRA); Voice plus Data (V+D) Part 2: Air Interface. ETSI." Section 23.7.6. on pages 543–544 defines the energy economy groups as follows:

| Group | Frames to Sleep |
| --- | --- |
| EG1 | 1 |
| EG2 | 2 |
| EG3 | 5 |
| EG4 | 8 |
| EG5 | 17 |
| EG6 | 71 |
| EG7 | 359 |

Frames to sleep herein refer to the frames during which the mobile station does not have to receive signalling from the control channel, that is, during those frames the mobile station may either receive or transmit transmissions on the direct mode channel or entirely omit to use the transceiver. For instance, if the system puts the mobile station to sleep in group G3 starting from frame 2, then the mobile station must receive frames 7, 13, 1, 7, 13, 1 etc. from the control channel of the mobile communications system, whereby the mobile station may operate in the way disclosed above during the other frames.

FIG. 6 shows an example of pre-emption frames of direct mode channel communication. The figure shows a multi-frame consisting of 18 frames, from which the pre-emption frames are marked with diagonals. The arrows show how a pre-emption frame shifts over the following two frames in each case.

Let us assume that the pre-emption frames form an arithmetical progression:
$\{X_{i+3}$, wherein $i=1, 4, 7, 10, 13, 16\}$ $(X_{19}=X_1, X_{20}=X_2, \ldots)$.
Thus, a suitable energy economy mode in the system can be e.g.:

$\{X_{i+3}$, wherein $i=2, 5, 8, 11, 14, 17\}$ $\{X_{i+3}$, wherein $i=3, 6, 12, 15, 18\}$ $\{X_{i+6}$, wherein $i=2, 8, 14\}$ $\{X_{i+6}$, wherein $i=3, 9, 15\}$ $\{X_{i+9}$, wherein $i=2, 11\}$ $\{X_{i+9}$, wherein $i=3, 12\}$ or $\{X_{i+18}$, wherein $i=2\}$.

All the energy economy groups of the system except for EG1 are possible provided that the energy economy start point is correct. When the premises described above are valid, the correct start point may be defined either as $\{X_{i+3}$, wherein $i=2, 5, 8, 11, 14, 17\}$ or as $\{X_{i+3}$, wherein $i=3, 6, 12, 15, 18\}$.

From the point of view of the system it is easy to switch to the energy economy mode: groups EG2–EG6 must be used and the energy economy mode must be started at the appropriate frame. A direct mode channel—specific event label can be used in the energy economy mode only if the system is able to put the mobile stations "to sleep" in the same period and possibly provide them with a common address i.e. event label. This requires the mobile station, upon reporting to the system, to communicate the identifier of the direct mode channel and the wish to operate in the dual watch mode.

The mobile station may request the energy economy mode upon registering (reporting) to the system or by sending a separate energy economy mode message. It takes place so that the mobile station requests an energy economy group determined for a certain direct mode channel (which is probably the same for all mobile stations), and the system then allows it and determines the start point. The protocol also enables the system to change the energy economy group from the one that was requested by the mobile station upon reporting.

FIG. 7 illustrates starting the energy economy mode, whereby the system chooses energy economy group EG2 starting from frame 5 (vertical arrow). The upper part of the figure illustrates the control channel and the lower part illustrates the direct mode channel. Like FIG. 6, FIG. 7 also shows a multiframe consisting of 18 frames, wherein diagonals represent the pre-emption frames of the direct mode channel, and grey dots represent the frames of the control channels during which the mobile station should listen to the control channel. After reporting/registering to the system, the mobile station must make an attempt to change the frame synchronization scheme of the direct mode channel for one that corresponds to the control channel of the system, if necessary, (provided that no other mobile station has already done it), for enabling dual watch operation. By means of the change, the mobile station communicates the fact that it is a question of synchronizing with the control channel of the system, and the frequency of said control channel and the time-slot of the control channel. This synchronization data is then repeated at suitable intervals. The figure shows sleeping frames 701, 702, 703, during which the mobile station communicating on the direct mode channel in accordance with the energy economy mode disclosed above does not have to listen to the transmissions of the mobile communications system (base station), since the system supposes the mobile station is in the energy economy mode. In accordance with the invention, the frame synchronization of the mobile station is arranged on the direct mode channel so that the pre-emption frames on the direct mode channel co-incide with the sleeping frames.

FIG. 8 shows a block diagram of the mobile station 400 of the invention, communicating on the direct mode channel, that is, a mobile telephone, mobile station or subscriber station used by a subscriber. The function of a transceiver station (TX/RX) 401 is to adapt to the radio channel used at a current moment. The transceiver 401 is connected to an antenna 402, which communicates with the radio path RP. Radio frequencies that are normally used are within the range 60–1000 MHz (VHF and UHF frequency bands), although other frequencies may also be used. On the radio path RP, analog modulation may be employed, whereby the modulation method is usually phase modulation. Other modulation techniques may also be used. For transmitting signalling, e.g. Fast Frequency Shift Keying Modulation (FFSK) may be employed. Transmission on the radio path may also be digital.

A user interface 405 comprises electroacoustic transducer means, typically a loudspeaker 406 and a microphone 407, and possibly buttons related to beginning, ending and dialling a call. As in a trunking system and especially on a direct mode channel a call on the radio path RP advantageously takes place in turns, the user equipment in most cases has a push-to-talk button that must be pressed down during the speech turn. The push-to-talk button is not shown in FIG. 8.

The task of a controller 403 is to control the operation of the mobile station. The controller 403 is connected to the user interface 405, from which it receives impulses associated with call initiation and termination. The controller 403 may also provide the user with sound or visual signs related to the operation of the mobile station and/or the mobile communications system via the user interface 405.

The controller 403 is connected to a transceiver TX/RX401. The channel used by the transceiver has been determined by the controller 403, that is, the transceiver 401 is tuned onto the channel, or the radio frequency determined by the controller 403, and to a suitable time-slot. The mobile station of the invention is able to tune itself onto the direct mode channel and onto the uplink and downlink channels and frequencies of the system channels. The transceiver 401 is also switched on under the control of the controller 403. The controller 403 receives and transmits signalling messages via the transceiver 401. The mobile station 400 of the invention communicating on the direct mode channel may be used e.g. in a mobile communications system comprising a mobile network comprising at least one base station and subscriber stations, and possibly one or more repeater stations for forwarding traffic between at least one base station and the subscriber stations communicating on the direct mode channel. In such a case, said mobile station communicating on the direct mode channel comprises a memory means 411, a transceiver 401 and a controller 403 for controlling the operation of the mobile station.

The mobile station 400 DMRU; 400, (FIG. 7) of the invention, communicating on the direct mode channel divided into frames consisting of time-slots comprises: a transceiver 401 arranged to receive and transmit transmissions of the mobile station, and a controller 403 for controlling the operation of the mobile station.

The mobile station of the invention 400 comprises means 409 responsive to the information transmitted by the mobile communications system, for switching the mobile station DMRU1, DMRU2, 400 to the dual watch mode on the one hand and to the energy economy mode on the other to communicate either on said direct mod channel DMCH or said control channel TMCCH so that while communicating on the direct mode channel, the mobile station may listen to the control channel between the transmission time-slots of the direct mode channel.

In the above, the use of the energy economy mode for improving the dual watch mode on the control channel of the system has been disclosed. Furthermore, the invention has an embodiment in accordance with which the energy economy mode is used on the direct mode channel, as well. This possibility is primarily related to the use of a repeater station. A repeater station RS (FIG. 1) forwards information messages between mobile station communicating on the direct mode channel. The information messages forwarded by the repeater station may be e.g. speech, data or signalling messages. The repeater station may employ a separate direct channel—specific energy economy mode. The energy economy cycle of this energy economy mode may be determined as a constant, or it may be dynamically adjustable. If the communication on the direct mode channel takes place in the energy economy mode, the energy economy cycle and the start frame of the direct mode channel should be timed so that they will. co-incide with the sleeping frame of the system channel. The advantage of the method is that the messages arriving from the system do not co-incide with the messages of the direct mode channel.

The operation of the invention in the further embodiment of the invention may also be implemented so that the data base DB, means 100 and means 110 disclosed above are located at the base station BS, C1.

The drawings and the explanation associated therewith are only intended to illustrate the idea of the invention. The method and the mobile communications system of the invention may be modified in its details within the scope of the attached claims. Although the invention has been disclosed above mainly in association with trunked mobile communications systems, the invention may also be used in other kinds of mobile communications systems.

What is claimed is:

1. A method for synchronizing a telecommunications connection in a mobile communications system having
    at least one base station communicating with mobile stations on time division multiple access system channels including of control channels and traffic channels whose uplink and downlink frequencies are divided into frames, a part of which may be defined dynamnically, by determining an energy economy mode start frame and length of an energy economy cycle, for a mobile station in the database as energy economy mode sleeping frames, during which the mobile station is not prepared to receive transmissions on downlink frequencies,
    at least a first mobile station communicating on a direct mode channel divided into frames and predisposed to operate in a dual watch mode both on a control channel of the mobile communications system and on the direct mode channel which comprises pre-emption frames, by which the mobile stations communicating on the direct mode channel request transmission turns for themselves, the method comprising:
        communicating from the at least first mobile station operating on the direct mode channel to the at least one base station a wish of the at least first mobile station to operate in the dual watch mode and to operate in an energy economy mode on the control channel of the mobile communications system;
        checking from the database (i) whether the energy economy mode start frame has been determined for the direct mode channel and (ii) the length of the energy economy cycle if the energy economy mode start frame has been determined for the direct mode channel, the checking from the database in response to a registration message associated with the at least first mobile station;
        determining and storing in the database the energy economy mode start frame and the length of the energy economy cycle wherein each of a number of pre-emption frames coincides with a corresponding number of sleeping frames of the energy economy mode, determining and storing if the energy economy mode start frame has not been determined for the direct mode channel;
        transmitting to the at least first mobile station information on a desired control channel of the at least one base station and timing information related to the desired control channel, and transmitting a command to switch to the energy economy mode, the command containing information on the energy economy mode start frame and the length of the energy economy cycle; and
        the at least first mobile station switching to the dual watch mode and to the energy economy mode, to communicate either on the direct mode channel or the control channel so that the at least first mobile station can listen to the control channel between transmission time-slots of the direct mode channel while communicating on the direct mode channel, the at least first mobile station switching in response to the information on the desired control channel, the timing information related to the desired control channel, the information on the energy economy mode start frame, and the length of the energy economy cycle.

2. A method as claimed in claim 1, further comprising:
    communicating from a second mobile station operating on the direct mode channel to the at least one base station a wish of the second mobile station to operate in the dual watch mode and in the energy economy mode on the control channel of the mobile communications system;
    checking from said database (i) whether an energy economy mode start frame has been determined for the direct mode channel and (ii) the length of an energy economy cycle if the energy economy mode start frame has been determined for the direct mode channel, the checking from the database in response to a registration message associated with the second mobile station;
    transmitting to the second mobile station information on a desired control channel of the at least one base station and timing information related to the desired control channel, and transmitting a command to switch to the energy economy mode, the command containing information on the energy economy mode start frame and the length of the energy economy cycle, transmitting to the second mobile station if the energy economy mode start frame has been determined for the direct mode channel; and
    the second mobile station switching to the dual watch mode and to the energy economy mode, to communicate either on the direct mode channel or the control channel so that the second mobile station can listen to the control channel between the transmission time-slots of the direct mode channel while communicating on the direct mode channel, the second mobile station switching in response to the information on the desired control channel, the timing information related to the desired control channel, the information on the energy economy mode start frame, and the length of the energy economy cycle.

3. A method as claimed in claim 1 or 2, characterized by carrying out the communicating by sending a registering message to the at least one base station on a system channel of the mobile communications system.

4. A method as claimed in claim 1 or 2, characterized by the mobile station activating the energy economy mode after registering to the system by sending a separate energy economy request message.

5. A method as claimed in claim 3, characterized by:
    the registering message containing an identifier of the direct mode channel on which the mobile station is operating; and
    checking from the database of the mobile communications system whether the energy economy mode start frame and the length of the energy economy cycle have been determined for the direct mode channel, the checking from the database in response to the identifier contained in the registering message.

6. A method as claimed in claim 5, characterized by utilizing the identifier of the direct mode channel contained in the registering message upon checking from the database whether the energy economy start frame and the length of the energy economy cycle have been determined for the direct mode channel, and upon storing the energy economy mode start frame and the length of the energy economy cycle in the database.

7. A method as claimed in claim 1, characterized by determining the energy economy mode start frame and the length of the energy economy cycle specifically for each base station.

8. A method as claimed in claim 1, characterized by determining specifically for each base station a same energy economy mode start frame and a same length of the energy economy cycle for all the dual watch mobile stations communicating via the base station.

9. A method as claimed in claim 1 or 2, characterized by communicating to the mobile station operating on the direct mode channel an event label of the energy economy mode, by means of which label all the mobile stations in the dual watch mode on the direct mode channel may be forced to switch or to end the energy economy mode.

10. A mobile communications system comprising:

a database;

at least one base station communicating with mobile stations in the mobile communications system on time division multiple access system channels of the mobile communications system including control channels and traffic channels having uplink and downlink frequencies divided into frames, part of which may be determined dynamically by determining an energy economy mode start frame and the length of an energy economy cycle, for a mobile station in the database as energy economy mode sleeping frames, during which the mobile station is not prepared to receive transmissions on the downlink frequencies;

at least a first mobile station communicating on a direct mode channel divided into frames, the at least first mobile station being predisposed to operate in a dual watch mode both on a control channel of the mobile communications system and on the direct mode channel which comprises pre-emption frames, by which the mobile stations communicating on the direct mode channel request transmission turns for themselves, the mobile communications system comprising:

means responsive to a registration message transmitted by the at least first mobile station for determining and storing in the database such an energy economy mode start frame and such a length of the energy economy cycle that each of a number of pre-emption frames co-incides with a corresponding number of sleeping frames of the energy economy mode; and means for transmitting information on a desired control channel of the at least one base station and timing information related to it, and information on the energy economy mode start frame and the length of the energy economy cycle to the at least first mobile station, wherein the means responsive to the registration message and the means for transmitting the information permit mobile stations communicating on the direct mode channel to request transmission turns.

* * * * *